US009787416B2

(12) United States Patent
Shiva et al.

(10) Patent No.: US 9,787,416 B2
(45) Date of Patent: Oct. 10, 2017

(54) ADAPTIVE JITTER BUFFER MANAGEMENT FOR NETWORKS WITH VARYING CONDITIONS

(71) Applicant: Apple Inc., Cupertino, CA (US)

(72) Inventors: Sundararaman V. Shiva, Los Gatos, CA (US); Hyeonkuk Jeong, Saratoga, CA (US); Roberto Garcia, Santa Clara, CA (US); Nirav R. Patel, San Francisco, CA (US); James O. Normile, Los ALtos, CA (US)

(73) Assignee: Apple Inc., Cupertino, CA (US)

( * ) Notice: Subject to any disclaimer, the term of this patent is extended or adjusted under 35 U.S.C. 154(b) by 497 days.

(21) Appl. No.: 14/020,606

(22) Filed: Sep. 6, 2013

(65) Prior Publication Data

US 2014/0072000 A1    Mar. 13, 2014

Related U.S. Application Data

(60) Provisional application No. 61/698,517, filed on Sep. 7, 2012, provisional application No. 61/698,519, filed
(Continued)

(51) Int. Cl.
*H04J 3/06* (2006.01)
*H04L 12/801* (2013.01)
(Continued)

(52) U.S. Cl.
CPC ............ *H04J 3/062* (2013.01); *H04J 3/0632* (2013.01); *H04L 47/12* (2013.01); *H04L 47/283* (2013.01); *H04L 47/14* (2013.01); *H04L 47/38* (2013.01)

(58) Field of Classification Search
None
See application file for complete search history.

(56) References Cited

U.S. PATENT DOCUMENTS 6,728,209 B2    4/2004  Pate et al.
6,747,999 B1    6/2004  Grosberg et al.
(Continued)

FOREIGN PATENT DOCUMENTS

WO    2005/043272    5/2005
WO    2005043272     5/2005
(Continued)

OTHER PUBLICATIONS

International Prelminary Report on Patentability in application No. PCT/US2013/058542 issued Mar. 19, 2015.
(Continued)

*Primary Examiner* — Chirag Shah
*Assistant Examiner* — Amar Persaud
(74) *Attorney, Agent, or Firm* — Meyertons, Hood, Kivlin, Kowert & Goetzel, P.C.

(57) ABSTRACT

An apparatus and method for detecting and analyzing spikes in network jitter and the estimation of a jitter buffer target size is disclosed. Detected spikes may be classified as jump spikes or slope spikes, and a clipped size of detected spikes may be used in the estimation of the jitter buffer target. Network characteristics and conditions may also be used in the estimation of the jitter buffer target size. Samples may be modified during playback adaptation to improve audio quality and maintain low delay of a receive chain.

19 Claims, 16 Drawing Sheets

Related U.S. Application Data on Sep. 7, 2012, provisional application No. 61/698,524, filed on Sep. 7, 2012.

(51) Int. Cl.
*H04L 12/841* (2013.01)
*H04L 12/811* (2013.01)

(56) References Cited

U.S. PATENT DOCUMENTS

| | | | |
|---|---|---|---|
| 6,862,298 | B1 | 3/2005 | Smith et al. |
| 7,246,057 | B1 | 7/2007 | Sundqvist et al. |
| 7,359,324 | B1 | 4/2008 | Ouellette et al. |
| 7,596,488 | B2 | 9/2009 | Florencio et al. |
| 7,916,742 | B1 * | 3/2011 | Bugenhagen ......... H04J 3/0632 370/352 |
| 8,045,571 | B1 | 10/2011 | Li et al. |
| 8,069,260 | B2 | 11/2011 | Speicher et al. |
| 8,218,579 | B2 | 7/2012 | Liu et al. |
| 8,225,127 | B2 | 7/2012 | Vonog et al. |
| 8,331,385 | B2 | 12/2012 | Black et al. |
| 8,594,169 | B2 * | 11/2013 | Zivny ............... G01R 31/31709 375/224 |
| 8,645,741 | B2 * | 2/2014 | Vonog ................. G06F 1/14 713/400 |
| 2002/0167911 | A1 | 11/2002 | Hickey |
| 2003/0112758 | A1 | 6/2003 | Pang et al. |
| 2003/0152093 | A1 * | 8/2003 | Gupta .................. H04J 3/0632 370/412 |
| 2006/0056383 | A1 * | 3/2006 | Black .................. G10L 19/005 370/350 |
| 2008/0059165 | A1 * | 3/2008 | Furuta ................. G10L 21/0208 704/226 |
| 2008/0181260 | A1 * | 7/2008 | Vonog ................. G06F 1/14 370/519 |
| 2008/0232521 | A1 * | 9/2008 | Rodbro ............... H04J 3/0632 375/354 |
| 2012/0099689 | A1 | 4/2012 | Mahkonen |
| 2012/0254649 | A1 * | 10/2012 | Vonog ................. G06F 1/14 713/400 |
| 2014/0111604 | A1 * | 4/2014 | Vonog ................. G06F 1/14 348/14.12 |
| 2014/0135068 | A1 * | 5/2014 | Anandakumar .. H04L 29/06027 455/563 |

FOREIGN PATENT DOCUMENTS

| | | |
|---|---|---|
| WO | 2008/069719 | 6/2008 |
| WO | 2008069719 | 6/2008 |

OTHER PUBLICATIONS

Ramjee R et al: "Adaptive playout mechanisms for packetized audio applications in wide-area networks", INFOCOM '94. Networking for Global Communications., 13th Proceedings IEEE Toronto, Ont., Canada Jun. 12-16, 1994, Los Alamitos, CA, USA,IEEE Comput. Soc, Jun. 12, 1994 (Jun. 12, 1994), pp. 680-688, XP01 0098440, 001: 10.11 09/INFCOM.1994.337672 ISBN: 978-0-8186-5570-8.

Jing Liu et al: "An Adaptive Receiver Buffer Adjust Algorithm for Voice & Video on IP Applications", Communications, 2005 ASIA-Pacific Conference on Perth, Western Australia Oct. 3-5, 2005, Piscataway, NJ, USA,IEEE, Oct. 3, 2005 (Oct. 3, 2005), pp. 669-673, XP01 0860868, 001: 10.1109/ APCC.2005.1554146 ISBN: 978-0-7803-9132-1.

Marco Roccetti et al: "Design and Experimental Evaluation of an Adaptive Playout Delay Control Mechanism for Packetized Audio for Use over the Internet", Multimedia Tools and Applications, May 1, 2001 (May 1, 2001), pp. 23-53, XP055084326, Boston 001: 10.1 023/A:1 011303506685 Retrieved from the Internet: URL:http://search.proquest.com/docviewf/757126887.

Liyun Pang et al: "E-Model based Adaptive Jitter Buffer with TimeScaling Embedded in AMR decoder", ICDT 2011, The Sixth International Conference on Digital Telecommunications, Apr. 17, 2011 (Apr. 17, 2011), XP055084329, Budapest, Hungary ISBN: 978-1-61-208127-4 Retrieved from the Internet: URL:http://www.thinkmind.org/download.php? articleid=icdt- 2011 - 4- 20 - 20105 [retrieved on Oct. 17, 2013].

Non-final Office Action, Taiwan Application No. 102132342, mailed May 27, 2015, 10 pages.

International Search Report and Written Opinion from PCT/US2013/058542, dated Oct. 25, 2013, Apple Inc., pp. 1-16.

Kluwer Academic Publishers, "Design and Experimental Evaluation of an Adaptive Playout Delay Control Mechanism for Packetized Audio for Use over the Internet", Marco Roccetti, et al; pp. 23-53, 2001.

The Sixth International Conference on Digital Telecommunications, "E-Model based Adaptive jitter Buffer with Time-Scaling Embedded in AMR decoder", Liyun Pang, et al; pp. 80-85, 2011.

IEEE, "Adaptive Playout Mechanisms for Packetized Audio Applications in Wide-Area Networks", Ramachandran Ramjee, et al., pp. 680-688; 1994, downloaded on Mar. 4, 2009.

2005 Asia-Pacific Conference on Communications, "An Adaptive Receiver Buffer Adjust Algorithm for Voice & Video on IP Applications", Jing Liu, et al., pp. 669-673, Oct. 3-5, 2005.

\* cited by examiner

ADAPTIVE JITTER BUFFER MANAGEMENT FOR NETWORKS WITH VARYING CONDITIONS

PRIORITY CLAIM

This application claims benefit of priority of U.S. Provisional Patent Application Ser. No. 61/698,517, filed on Sep. 7, 2012, U.S. Provisional Patent Application Ser. No. 61/698,519, filed on Sep. 7, 2012, and U.S. Provisional Patent Ser. No. 61/698,524, filed on Sep. 7, 2012, each of which is incorporated herein by reference.

BACKGROUND

Technical Field

This disclosure relates generally to the field of adaptive jitter buffer management, as part of multimedia communications. While the use of jitter buffer and adaptive playback are well known, the embodiments provide significant enhancements in terms of optimal spike detection and handling, network specific dynamic adaptations, and improved playback adaptations in the presence of speech or silence.

Description of the Related Art

Fixed and mobile computing systems typically communicate through a network. The network may be wired or wireless and may transmit data in discrete portions or packets. When receiving data, a computing system may sequentially receive numerous data packets, and assemble the received data packets to re-construct the original data.

As data packets are transmitted from one device on a network to another device on a network, individual packets may experience different transit times to their respective destinations. Such variation in transmit times is referred to as "jitter" or "network jitter" and may result from differences in queuing and scheduling differences, differences in a routing path through the network and the like. A certain amount of jitter may always be present on a network, while in other cases, network jitter may vary as a function of time. Network congestion, a hot-spot on the communication channel, and the like, may contribute to temporary high values of jitter (commonly referred to as "spikes") on a network.

Network jitter may present problems when transmitting certain types of data. For example, when the transmitted data contains audio and/or video data, it is often necessary to temporarily store some number of packets to buffer the data so that smooth playback at the receiving end of the data transmission is possible. The number of packets that need to be stored may be a function of network jitter, and may need to be optimized to maintain good quality and low delay.

One particular method of compensating for network jitter, employs a jitter buffer in a receive chain of a multimedia device. A jitter buffer may be configured to store a target number of data packets as they are received from a network. A control unit may be configured to calculate a jitter value for at least some of the received data packets, and also estimate a target size of the buffer based on the network type, conditions and jitter.

In conjunction with a jitter buffer, a multimedia device may also employ a playback adaptation unit to improve playback of audio and/or video data. The playback adaptation unit may be configured to retrieve stored packets from the jitter buffer, decode the data in the packets into samples, and process the samples thereby controlling the actual size of the buffer to match the adaptive target, while maintaining the same playback rate. When processing audio data, the playback adaptation unit may detect samples that contain speech or silence. Samples containing speech and silence may be stretched or compressed as needed. The compression of speech is called "warping", compression of silence "skipping", and expansion of silence "duping". Adapting samples during a silence period, i.e., silence-addition and silence-removal, may be desirable in some cases to maintain performance and audio quality.

SUMMARY OF THE EMBODIMENTS

In one embodiment, spikes in network jitter may be detected and characterized as jump spikes or slope spikes. The spikes may be clipped during the jitter buffer size estimation. An exit condition for leaving a detected spike may be based on at least one of a determination average jitter is flat, jitter values have returned to a level similar to the level of jitter prior to detection of the spike, or a predetermined amount of time has elapsed.

In some cases, spikes may occur regularly on some networks, and may need a different treatment particularly for that network. For example, certain networks may perform tune-on and tune-off that may result in periodic spikes. In another embodiment, such spikes are identified specifically for those networks, and may be incorporated into the minimum jitter buffer size. By incorporating the network specific spikes into the minimum jitter buffer size, a need to handle them on a regular basis may be reduced. Such an embodiment may also be applied to account for other periodic spikes resulting from scheduling packet transmissions after a sample rate conversion on the encoder side, for example.

In some cases, large spikes may happen regularly in marginal conditions, and a trade-off between whether to clip these spikes or allow them at the cost of increased playback delay becomes an important factor. In another embodiment, strategies may be employed to identify marginal conditions, associate a cost with accommodating these spikes, and use a percentile threshold to either accommodate or clip the spikes for jitter buffer size estimation.

In another embodiment, the jitter buffer size may be adjusted when recovering from network congestion or a spike. In these instances, the instantaneous jitter may drop back to the floor as conditions recover, but an increase in the jitter buffer size may result as the deviation from average starts to increase. Even in the case of a distribution model, the range that is used to estimate the jitter buffer as a function of difference of maximum and minimum over a window may start to increase. This may be because the minimum lag can start to drop when recovering from congestion and may actually increase the range as a result. The jitter buffer size may be maintained at the same size when such a scenario is encountered.

In another non-limiting embodiment, use of playback adaptations may be used improve performance both in terms of audio quality and in maintaining low delay on the receive chain.

In one embodiment, both the instantaneous and root means square (RMS) value of the audio samples may be used together to detect silence. Since the RMS value of samples falls slower than the instantaneous value, the silence threshold may be detected at an offset from the silence boundary thereby preventing end of phonemes from getting discarded.

In another embodiment, an RMS value of the speech may be directly used to control the rate of adaptation. As the RMS value increases, probability of speech may be higher and the rate of adaptation may be lower. This may remove the need to use more advanced algorithms to detect speech or silence while still maintaining the same quality of audio playback.

In another embodiment, thresholds are used to enable warping. If silence cannot be detected for a time period exceeding a predetermined threshold due to factors such as, e.g., road noise, background music and the like, warping may be enabled at a low rate of adaptation even though the thresholds may not warrant warping to be used. This may minimize large conversational delays from lingering for a long time.

BRIEF DESCRIPTION OF THE DRAWINGS

The following detailed description makes reference to the accompanying drawings, which are now briefly described.

Figure 1:
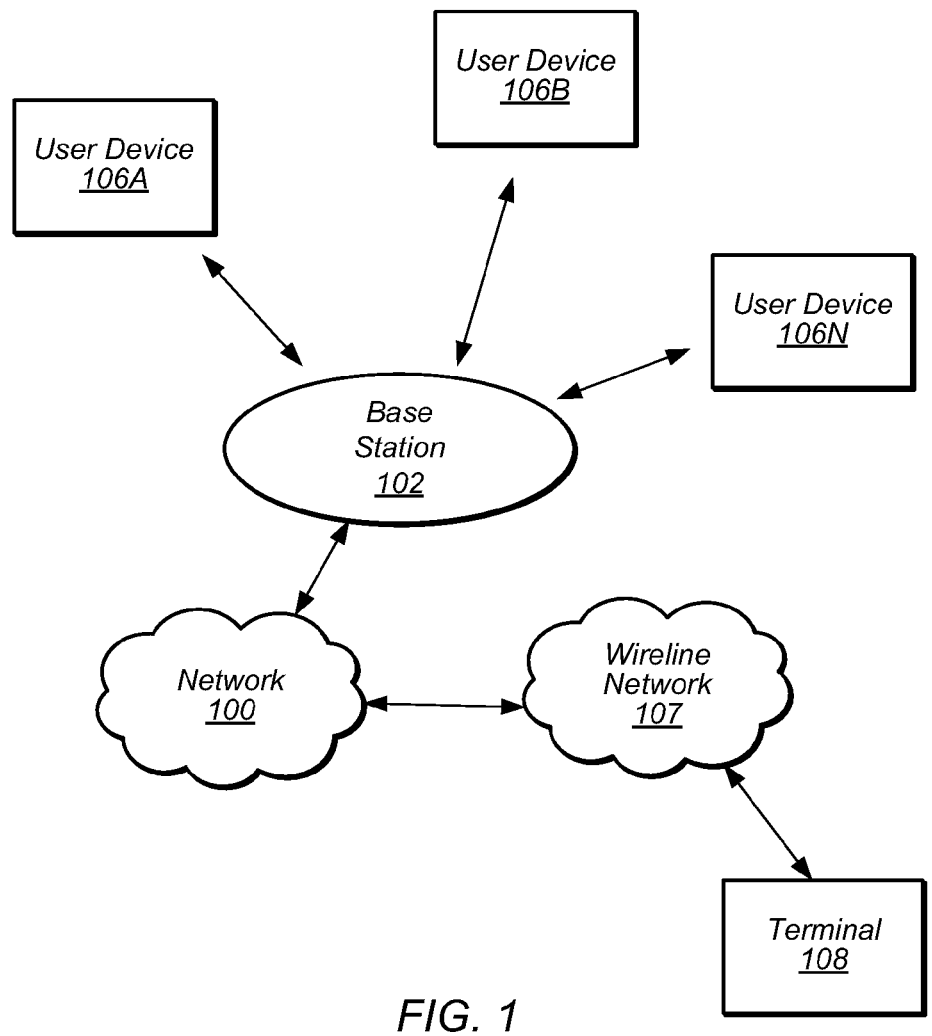
FIG. 1 illustrates an embodiment of a wireless communication system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

Acronyms

The following acronyms are used in the present Patent Application:

LTE: Long Term Evolution
UMTS: Universal Mobile Telecommunication System
GSM: Global System for Mobile communications
C-DRX: Continuous Disconnected Reception
UL: Uplink
DL: Downlink Terms The following is a glossary of terms used in the present application:

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Terminal—Any computer system that is connected to a wire-line local network or hub. Examples are personal computers connected to a DSL modem, cable modem, router or hub. Terminals also included possible but rare scenarios where the computer system is directly or indirectly connected to the Base Station.

Base Station (BS)—The term "Base Station" has the full breadth of its ordinary meaning, and at least includes a wireless communication station installed at a fixed location and used to communicate as part of a wireless telephone system or radio system.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Overview

Computing devices may be connected through wired or wireless networks. Some networks may transmit data in discrete formatted portions (commonly referred to as "packets"). Differences in scheduling and queuing through various network devices may result in different transit times for packets being transmitted from a source to a destination. In some cases, packets may arrive at the destination in a different order from the order which they were transmitted in. In order to properly re-construct the transmitted data, it may be necessary to temporarily store the receive packets. Audio and/or video data may be particularly sensitive network jitter and may require additional processing once the data packets have been received to ensure smooth playback.

Determining the proper number of packets to store to minimize the impact on the performance of the receiving system may be dependent on properties of the network and real-time variation in the transit time for the packets. It is important to balance the additional delay of storing more packets versus the loss of packets to provide a desired level of audio and/or video quality. For example, spikes in network jitter may result in an estimation of a large size for a jitter buffer, thereby increasing delay in processing received data packets once the jitter spike is no longer present. The embodiments illustrated in the drawings and described below may provide techniques for identifying, characterizing and clipping spikes in jitter on a network, to maintain a target size for a jitter buffer that results in both high performance and Wireless Communication Systems FIG. 1 illustrates an embodiment of a wireless communication system. It is noted that the system of FIG. 1 is merely one example of a possible system, and embodiments of the disclosure may be implemented in any of various systems, as desired.

The illustrated embodiment includes a base station 102 which communicates over a transmission medium with one or more User Equipment (UE) (or "UE devices") 106A through 106N.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The base station 102 and the UEs may be configured to communicate over the transmission medium using any of various wireless communication technologies such as LTE, UMTS, GSM, CDMA, WLL, WAN, WiFi, WiMAX, etc.

In some embodiments, a wire line local network 107 such as, e.g., a cable or DSL modem, router, hub, and the like, may be coupled to the network 100 and may provide network access to terminal 108. In other embodiments, terminal 108 may be directly or indirectly coupled to the network via a Base Station.

Figure 2:
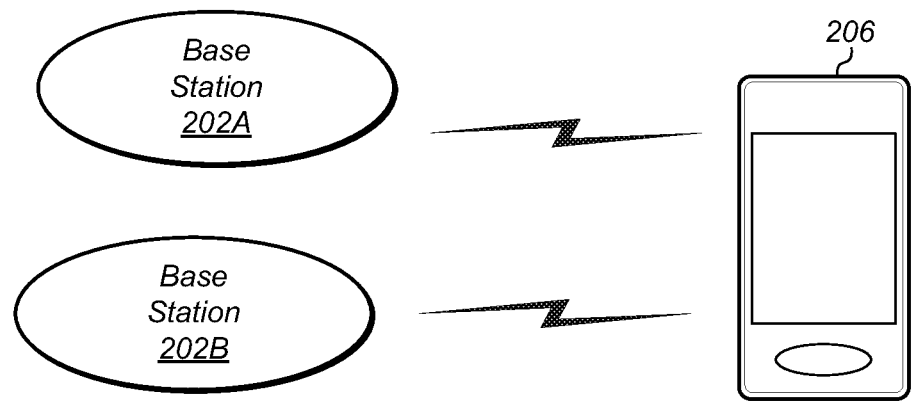
FIG. 2 illustrates an embodiment of a user device communicating with multiple base stations.

FIG. 2 illustrates a user equipment device communication with multiple base stations. In various embodiments, UE 206 may correspond to one of the devices 106A through 106N as illustrated in FIG. 1. UE 206 may be a device with wireless network connectivity such as a mobile phone, a hand-held device, a computer or a tablet, or virtually any type of wireless device. UE 206 may include a processor that is configured to execute program instructions stored in memory. In some embodiments, UE 206 may perform any of the embodiments described herein by executing such stored instructions. In other embodiments, UE 206 may include a programmable hardware element such as an FPGA (field-programmable gate array) that is configured to perform any of the method embodiments described herein, or any portion of any of the method embodiments described herein.

In various embodiments, UE 206 may be configured to tune-on and tune-off between the base station 202A and base station 202B at periodic intervals. It is noted that embodiment illustrated in FIG. 2 is merely an example. In other embodiments, different numbers of UE devices may communicate with different numbers of different numbers of base stations.

Jitter Detection and Compensation

Figure 3:
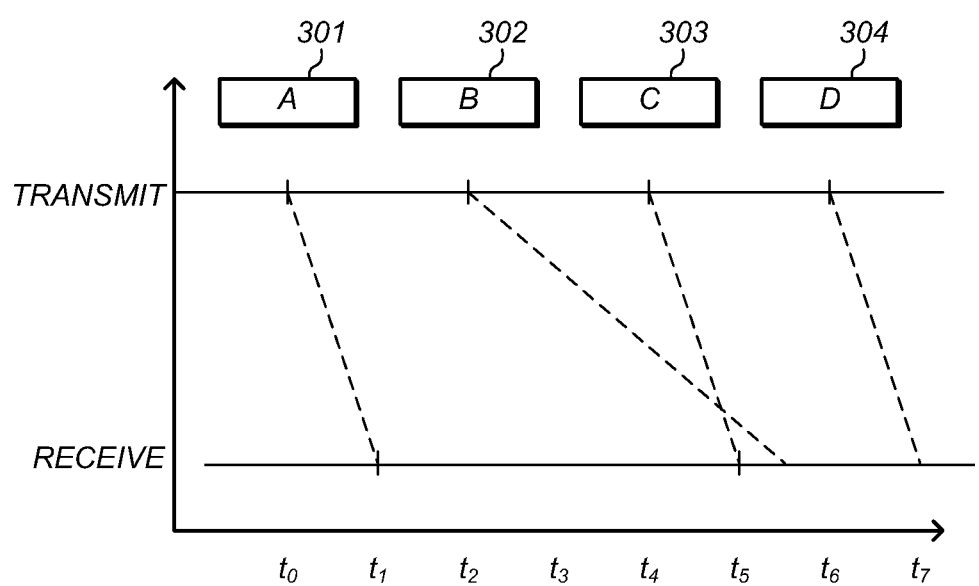
FIG. 3 illustrates an example of packet transmission on a network.

Turning to FIG. 3, an example of packet transmission on a network, such as, e.g., network 100 as illustrated in FIG. 1, is depicted. At time $t_0$, packet A 301 is transmitted, and is later received at time $t_1$ at a destination. The packet may, in various embodiments, be transmitted from a UE device, such as, e.g., UE devices 106 as illustrated in FIG. 1, or a base station, such as, e.g., base station 102 as depicted in FIG. 1. The delay from time $t_0$ to time $t_1$ may be the result of queuing and scheduling delays within the network. In some embodiments, a packet may be relayed through one or more base stations or UE devices before arriving at its destinations. At each relay point, additional delay may result as the packet is scheduled for re-transmission. It is possible that packets may be re-ordered at arrival as illustrated on packets 302 and 303.

The variation in transit time for individual packets is commonly referred to as "jitter." A jitter value for a packet may be calculated by taking the difference between the expected arrival time of the packet and the actual time the packet arrives. The expected time of arrival for the packet may be determined using timestamp information from previously received packets. Different packets transmitted from a source, such as, e.g., UE devices 106 as illustrated in FIG. 1, may travel to the destination in different amounts of time, resulting in each given packet having a different jitter.

To reduce the impact of the jitter, as packets are received, the packets may be stored in a buffer (also referred to herein as a "jitter buffer"). An example of a jitter buffer is illustrated in the embodiment of a receive chain depicted in FIG. 4. A small jitter buffer may not accommodate packet jitter, resulting in erasures being played in the absence of actual data. A large jitter buffer may accommodate packet jitter but may increase playback delay. An adaptive and optimal jitter buffer size may need to be estimated for good audio playback and low delay.

In some cases, high jitter may be regularly or sporadically observed and may be identified as a spike. Such spikes may be a characteristic of a network or a temporary condition resulting from marginal conditions. The embodiments illustrated and described herein may be directed towards identifying, characterizing and clipping spikes for use in jitter buffer size estimation.

Jitter buffer 402 may be designed in accordance with one of numerous design styles. During operation, receiving interface 401 may receive data packets from incoming data packets port 404. The received data packets may then be stored in jitter buffer 402. In some embodiments, a controller 403 may determine a number of packets that may be stored in jitter buffer 402.

Playback adaptation module 405 may, in various embodiments, perform processing such as, e.g., speech identification, on samples decoded from packets de-queued from jitter buffer 402. Playback adaptation module 405 may also be used to maintain the target jitter buffer size by expanding or contracting samples at a given rate of adaptation.

In some embodiments, ranges may be set for a target size of a jitter buffer. A "maximum cap" or a "minimum floor" may be employed. The type of network, such as, e.g., EDGE, the receiver is connected to may be used to determine such cap and floor values. In other embodiments, the type of network may also be used to set some thresholds for spike detection, such, e.g., a jump threshold which will be described later in more detail.

Figure 5:
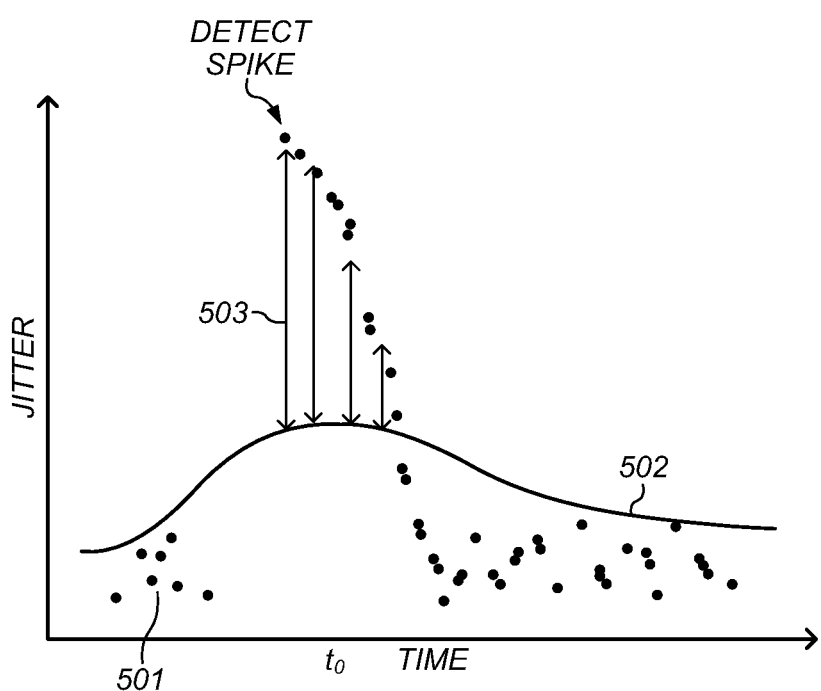
FIG. 5 illustrates an example jitter waveform.

An example waveform illustrating a spike in the calculated jitter is depicted is illustrated in FIG. 5. Each dot 501 represents a calculated jitter value for a received packet. In some embodiments, a jitter value may be calculated for each received packet, while in other embodiments, jitter values may be calculated for some of the received packets. A slow moving average of the calculated jitter values may be calculated and is represented by waveform 502. The deviation (or difference) of individual jitter values from the slow moving average may also be determined. For the purposes of clarity, only a few deviations 503 are shown. Such deviations from the slow moving average may be used to determine spikes in jitter as packets are transmitted through the network. The spike illustrated in FIG. 5 may be characterized by a rapid increase in the jitter values around time $t_0$, lasting for a short period of time. This type of jitter spike is commonly referred to as a "jump spike."

Jump spikes, such as the spike illustrated in FIG. 5, may be the result of the packets being held at some point in the network which results in a brief period when no packets are being received. After the brief period, the delivery of packets resumes and the jitter levels return to a level similar to that prior to the spike. It is noted that depiction of network jitter as illustrated in FIG. 5 is merely an example, and in other embodiments, different number of spikes and spikes of different magnitudes of spikes may be possible.

Figure 4:
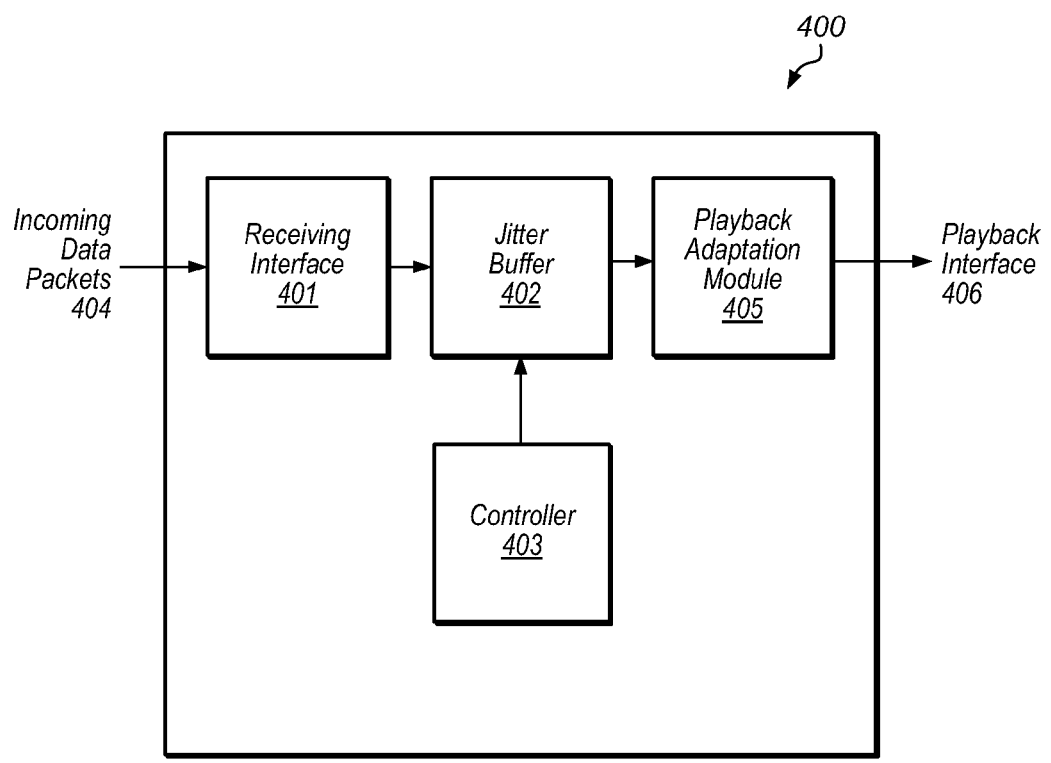
FIG. 4 illustrates a block diagram of an embodiment of a multimedia receive chain.
Figure 6:
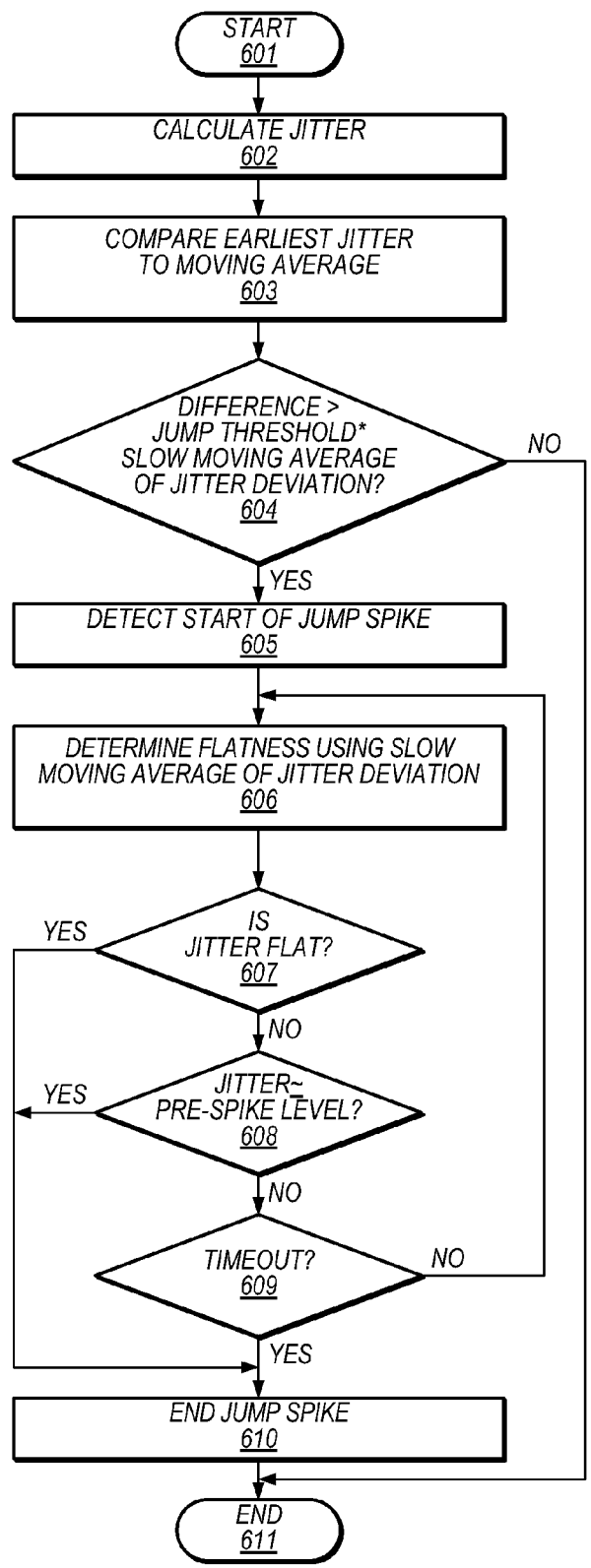
FIG. 6 illustrates an example flow diagram to adjust jitter buffer size based on jitter spike detection.

An example method of detecting a jump spike for packets transferred in a network is illustrated in FIG. 6. Referring collectively to FIG. 5 and FIG. 6, the method begins in block 601. Packets may then be received by an interface circuit, such as, e.g., receiving interface 401 as depicted in FIG. 4, and jitter values for each received packet may then be calculated (block 602). The earliest jitter values may then be compared to the slow moving average 502 (block 603). In some embodiments, a processor or controller, such as, e.g., controller 403 as illustrated in FIG. 4, may subtract each jitter value from the slow moving average.

The determined difference in the jitter values from the slow moving average such as, e.g., deviation 503, may then be compared against the product of a predetermined jump threshold and the slow moving average of jitter deviation values. In some embodiments, the predetermined jump threshold may be a function of the type of network connected to the receiver. The method may then depend on the result of the comparison (block 604). When a deviation is less than the calculated product of the predetermined jump threshold and the slow moving average, the method may then conclude in block 611.

When the difference is greater than or equal to the previously determined product, a start of a jump spike may have been detected (block 605). In some embodiments, for the duration of the jump spike, the value of the jitter being used to determine the target size of the jitter buffer may be limited or "clipped." By limiting the target size of the jitter buffer, a computing device may, in various embodiments, prevents large jitter buffer sizes from being estimated and, in turn, excess latency from being introduced into a packet receiving path.

Once a jump spike has been detected, subsequent jitter values may then be examined. The relative change in subsequent jitter values, i.e., a measure of the "flatness" of the jitter, may then be determined by comparing the subsequent jitter values to the slow moving average of jitter deviation (block 606). The method may then depend on the determined flatness (block 607). When the jitter is flat, the end of the jump spike has been reached (block 608) and any limitations on the target size of the jitter buffer may be disabled, allowing the use of any suitable algorithm to determine the target jitter buffer size. The method may then conclude in block 611.

When the jitter is not flat, the method may then depend on a comparison of the current jitter level to the jitter level prior to the detection of the spike (block 608). When the current jitter level is approximately equal to the jitter level prior to the detection of the spike, the end of the jump spike may have been reached (block 610). The method may then conclude in block 611.

When the current jitter level is higher than the jitter level prior to the start of the jump spike, the method may then depend on an amount of time that has elapsed since the start of the jump spike (block 609). In some embodiments, a counter or other suitable timekeeping circuit may be started when the start of a jump spike is detected. The timekeeping circuit may track a predetermined amount of time, and when the predetermined amount of time has transpired, it may be assumed that the jump spike has ended. The method may then conclude in block 611. While the timeout condition has not been satisfied, the previously described detection methods, such as, e.g., checking the flatness of the jitter, may still be employed to determine if the jump spike has ended (block 606).

It is noted that one or more of the operations illustrated in FIG. 6 are depicted as being performed in a sequential fashion. In other embodiments, one or more of the operations may be performed in parallel or in an order different that the illustrated order.

Figure 7:
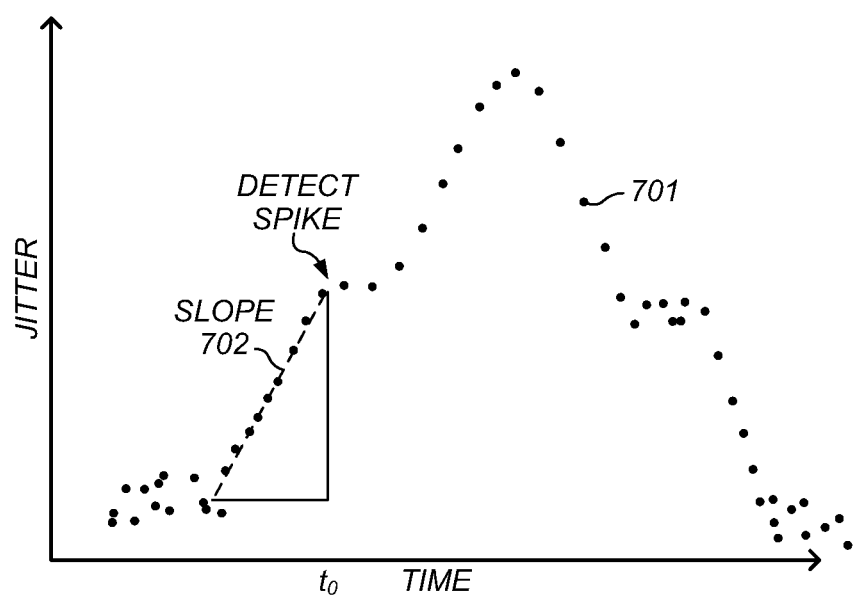
FIG. 7 illustrates another example jitter waveform.

Variation in network jitter may be detected in other ways. Turning to FIG. 7, another example of a jitter waveform is illustrated. In the example waveform, an abrupt change in the slope of the jitter data (commonly referred to as a "slope spike") is depicted. As described above in regards to FIG. 5, each dot 702 represents a calculated jitter value for a given data packet. In various embodiments, the calculated jitter value may depend upon an arrival time and a timestamp of a given data packet.

A slope, i.e., jitter per unit time, may be calculated using multiple jitter values calculated over a period of time. For example, slope 502 may be calculated over a period of time ending at time $t_0$. For the purposes of clarity, only one slope calculation has been shown, although it is note that in other embodiments, multiple slope calculations may be performed. At time $t_0$, the slope of the jitter values changes abruptly. Such a change in slope, either positive or negative, may be used to indicate the start of a slope spike. In some embodiments, the start of a slope spike in the jitter values may be used to adjust a size of a jitter buffer, or limit a change in size of the jitter buffer. It is noted that waveform illustrated in FIG. 7 is merely an example and, in other embodiments, difference changes in slope of the jitter data may be possible.

Figure 8:
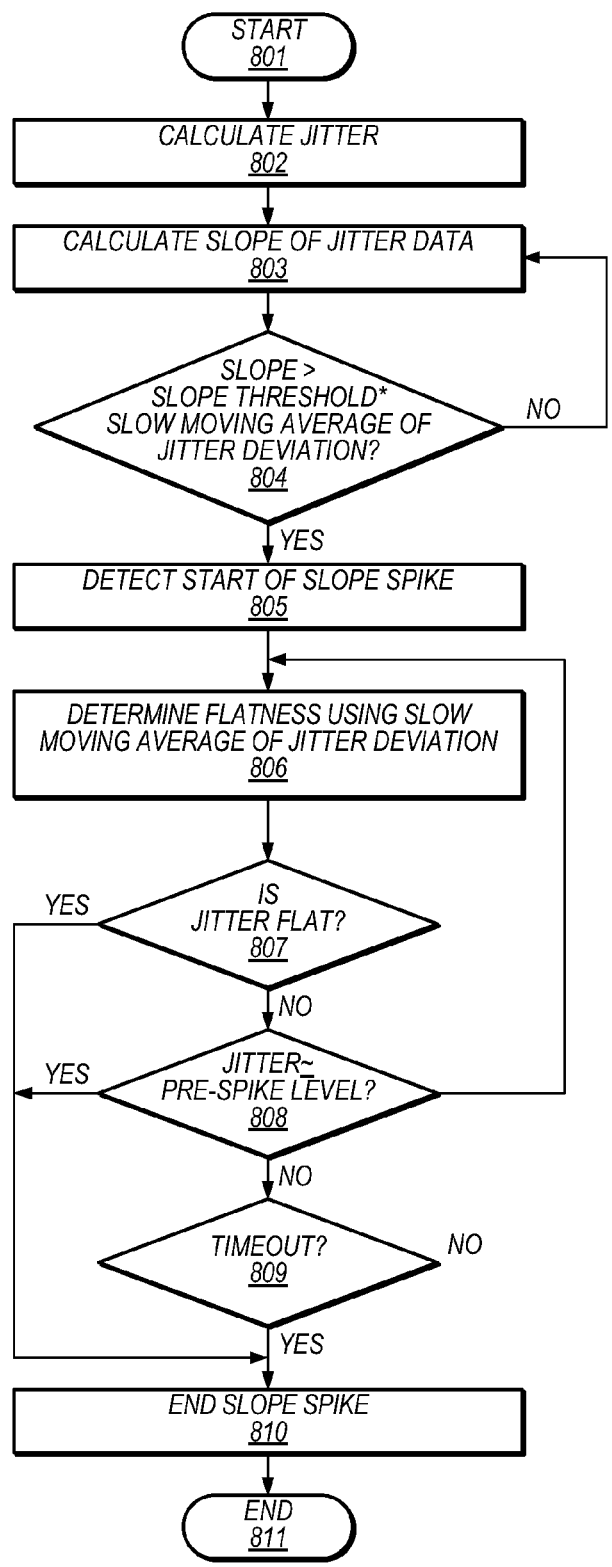
FIG. 8 illustrates an example flow diagram to adjust jitter buffer size based on jitter slope detection.

An example method of detecting a slope spike for packets transferred in a network is illustrated in FIG. 8. Referring collectively to FIG. 7 and FIG. 8, the method begins in block 801. Packets may be received by an interface circuit, such as, e.g., receiving interface 401 as depicted in FIG. 4, and jitter values for each received packets may then be calculated (block 802). The slope of the jitter data may then be calculated (block 803). In some embodiments, a processor or controller, such as, e.g., controller 403 as illustrated in FIG. 4, may calculate a slope value using two or more jitter values from data packets received at different times.

The calculated slope such as, e.g., slope 702, may then be compared against the product of a pre-determined slope threshold and the slow moving average of jitter deviation values. In some embodiments, the pre-determined slope threshold may be a function of the type of network connected to the receiver. The method may then depend on the result of the comparison (block 804). When the difference is less than the previously determined product, no spike has been detected and the slope value may be updated (block 803).

When the difference if greater than or equal to the previously determined product, a slope spike has been detected (block 805). In some embodiments, for the duration of the slope spike, the value of the jitter being used to determine the target size of the jitter buffer may be limited or "clipped." Further processing of a slope spike may be performed in a method similar to that described for jump spikes as described above in reference in FIG. 6.

Figure 9:
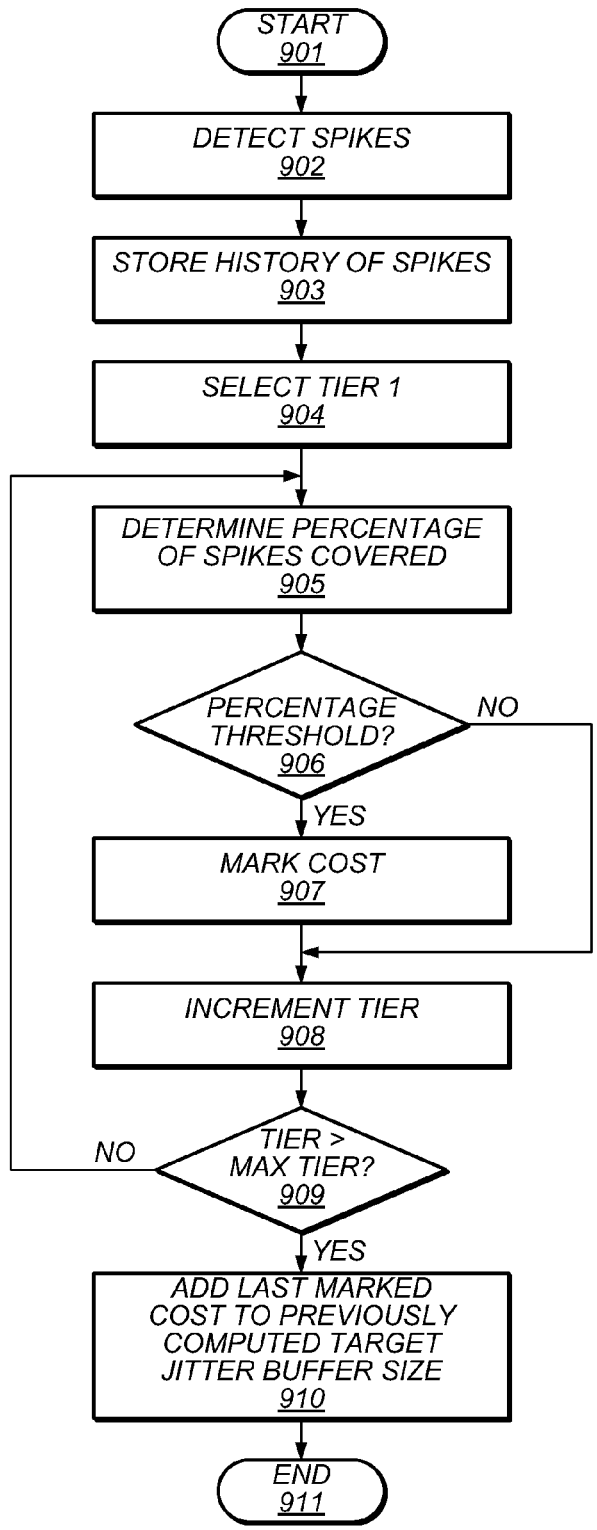
FIG. 9 illustrates an example flow diagram to adjust jitter buffer size based on percentile ranges.

An example method of selecting a target size of a jitter buffer is illustrated in FIG. 9. The method begins in block 901. Jitter spikes may then be detected (block 902). A history of the detected spikes may be accumulated (block 903). In some embodiments, a processor or controller, such as, e.g., controller 403 as illustrated in FIG. 4, may store information regarding detected spikes in a memory. Information regarding the size, duration, and any other suitable information may, in various embodiments, be stored. A first level or tier of delay cost may then be selected (block 904). In some embodiments, the delay cost may correspond to an amount of delay introduced into a computing system due to the size of the jitter buffer.

A determination may then be made as to how many of the previously detected and stored jitters spikes may be compensated, i.e., (also referred to herein as being "covered") by a jitter buffer size corresponding to the selected level of delay (block 905). The method may then depend on the percentage of covered spikes (block 906).

When the percentage of covered spikes meets or exceeds a predetermined threshold for that tier, the current delay cost may then be marked (block 907). In some embodiments, the current delay cost may be saved in memory for future reference. Once the current delay cost has been marked, the tier level, i.e., the level of delay, may be incremented (block 908). The method may then depend on the tier level (block 909). When the maximum tier has not been reached, a new determination of how many of the previously detected spikes are covered using the incremented tier level may then be performed (block 905). The method may then proceed from block 905 as described above. When the maximum tier has been reached, the last marked cost is added to the previously computer target jitter buffer size (block 910). Once the target jitter buffer size has been increased, the method may then conclude in block 911.

Figure 10:
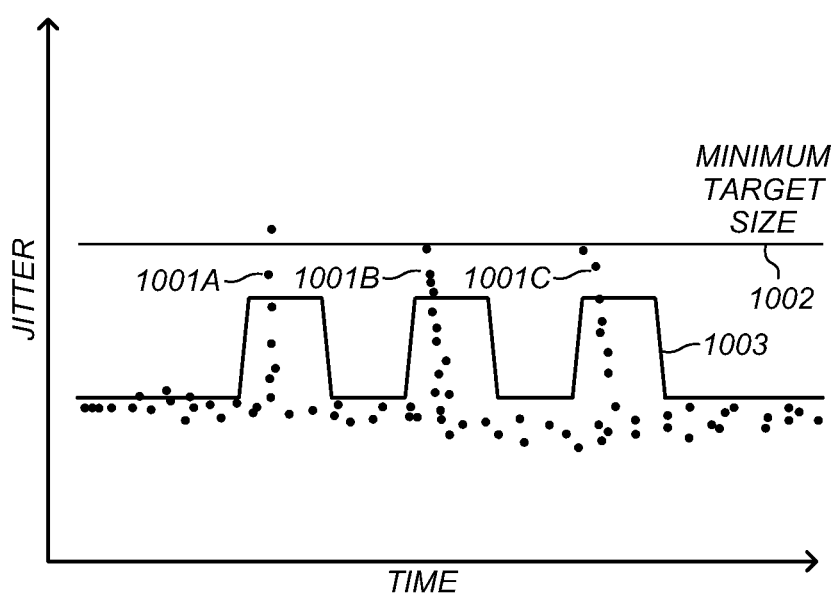
FIG. 10 illustrates an example jitter waveform with periodic spikes.

In some embodiments of networks, there may be periodic small jitter spikes which are function of the network itself and do not vary over time or with network traffic. An example of a jitter waveform illustrating such an embodiment is depicted in FIG. 10. In the example waveform of FIG. 10, several small periodic jitter spikes (1001A through 1001C) are illustrated. In some embodiments, spikes 1001A through 1001C may result in respective increases in the target size of the jitter buffer as depicted in waveform 1001. In other embodiments, a minimum target size for a jitter buffer as depicted in waveform 1002 may be selected to compensate for such jitter spikes. A minimum target size for the jitter buffer may, in some embodiments, prevent constant adjustment to the target size for the jitter buffer. The waveforms illustrated in FIG. 10 are merely examples. It is noted that, in other embodiments, the jitter spikes may be of different magnitude and occur with a different periodicity.

Figure 11:
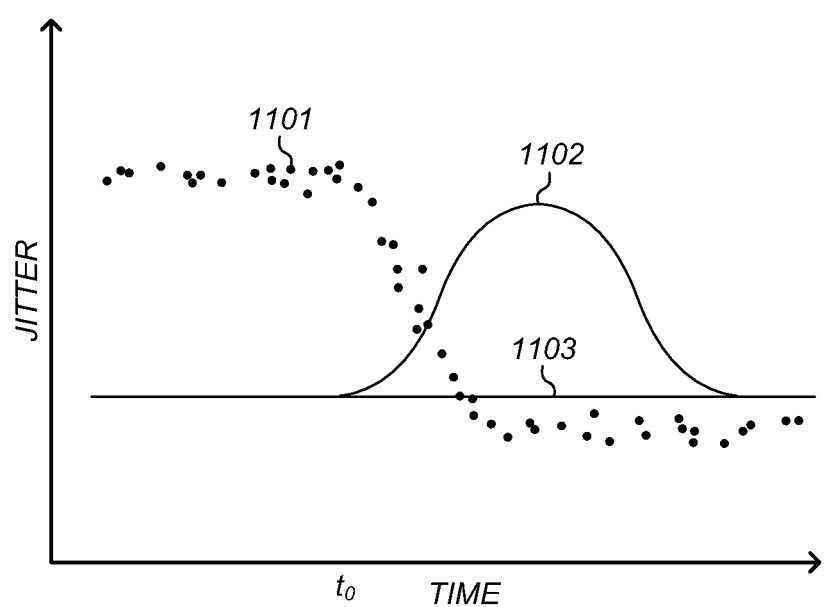
FIG. 11 illustrates an example of a decreasing jitter waveform.

In some embodiments, the aforementioned jitter detection schemes, may lead to an undesirable increase in the target jitter buffer size. An example jitter waveform depicting a decrease in jitter of packets transmitted on a network is illustrated in FIG. 11. In the illustrated embodiments, jitter values 1101 may be determined as described above in regard to FIG. 4. In the example illustrated in FIG. 11, the jitter values start to decrease at time $t_0$. The decrease in jitter may be the result of recovering from network congestion or a spike.

Figure 12:
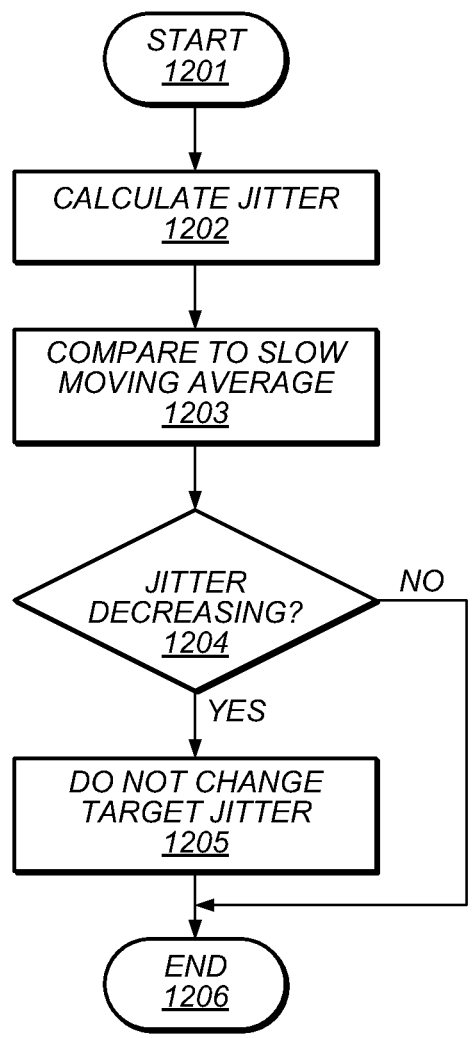
FIG. 12 illustrates an example flow diagram to adjust jitter buffer size based on detection of a decrease in jitter.

An example method of controlling the target size of a jitter buffer receiving packets from a network is illustrated in FIG. 12. A jitter value may be calculated for a received packet (block 1202). The calculate jitter value may then be compared to a slow moving average (block 1203). In some embodiments, the slow moving average may be calculated dependent on jitter values of some of all previously received packets. The method may then depend on a determination if the jitter is decreasing (block 1204). In some embodiments, multiple calculated jitter values may be compared against the slow moving average to determine a statistical trend.

As shown in waveform 1102, the target size of a jitter buffer may increase as a result of the decrease in jitter due to method of calculating the slow moving average. The increased target size of the jitter buffer may, in some embodiments, introduce undesirable delay into operations, such as, audio playback, for example. Waveform 1103, however, illustrates an embodiment where the target size of the jitter buffer does not need to be changed (or increased) in response to the decrease in jitter values.

When the calculated jitter is not decreasing, the method may conclude in block 1206. When the calculated jitter is decreasing, the target size of the jitter buffer may be held at its current value (block 1205). In some embodiments, by maintaining the target size of the jitter buffer, additional latency in the processing of data packets may be avoided. Once the determination has been made to maintain the current target size of the jitter buffer, the method may then conclude in block 1206. It is noted that the method illustrated in FIG. 12 is merely an example and that different operations different orders of operations are possible and contemplated.

It is noted that waveforms depicted in FIG. 11 are merely an example. In other embodiments, different variations of jitter and different variations in target jitter buffer size may be possible.

Figure 13:
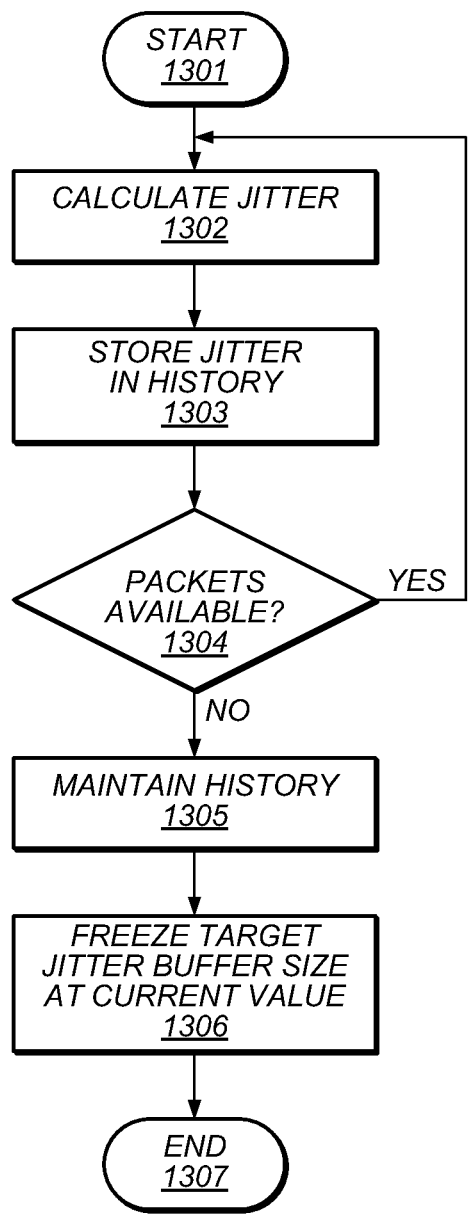
FIG. 13 illustrates an example flow diagram to adjust jitter buffer size during packet blackout.

In some embodiments of networks, there may be periods of time in which no packets are received (commonly referred to as "blackout"). In such cases, a device on the network may perceive the loss of packets as the network having a large amount of jitter. In response to this, the device may increase the target size of the jitter buffer. The increase in the target size of the jitter buffer may add unwanted delay into the processing of the data packets, once data packets are again received. An example method of handling the target size of the jitter buffer during blackout is illustrated in FIG. 13. The method begins in block 1301. Jitter values for incoming packets may then be calculated (block 1302). In some embodiments, a controller or processing unit, such as, e.g., controller 403 as illustrated in FIG. 4, may calculate the jitter values. Once the jitter values have been calculated, the jitter values may then be stored to form a history of jitter values (block 1303).

The method may then depend on if data packets are available (block 1304). When packets are still being received, jitter values are calculated for the newly arrived jitter packets, and the method may continue from block 602 as described above.

When packets are no longer being received, the history of jitter values is preserved (block 1305). In some embodiments, the target jitter buffer size may be re-calculated based using the saved history. Once the history of jitter values has been saved, the target size for the jitter buffer may be frozen at its last value (block 1306). In some embodiments, by freezing the target size of the jitter buffer at its last value, a receiving device may have a value of a number of packets to store once the packets are again received. The method may then conclude in block 1307. It is noted that some of the operations illustrated in the flowchart of FIG. 13 are depicted as being performed in a sequential fashion. In other embodiments, one or more of the operations may be performed in parallel.

Playback Adaptation

Figure 14:
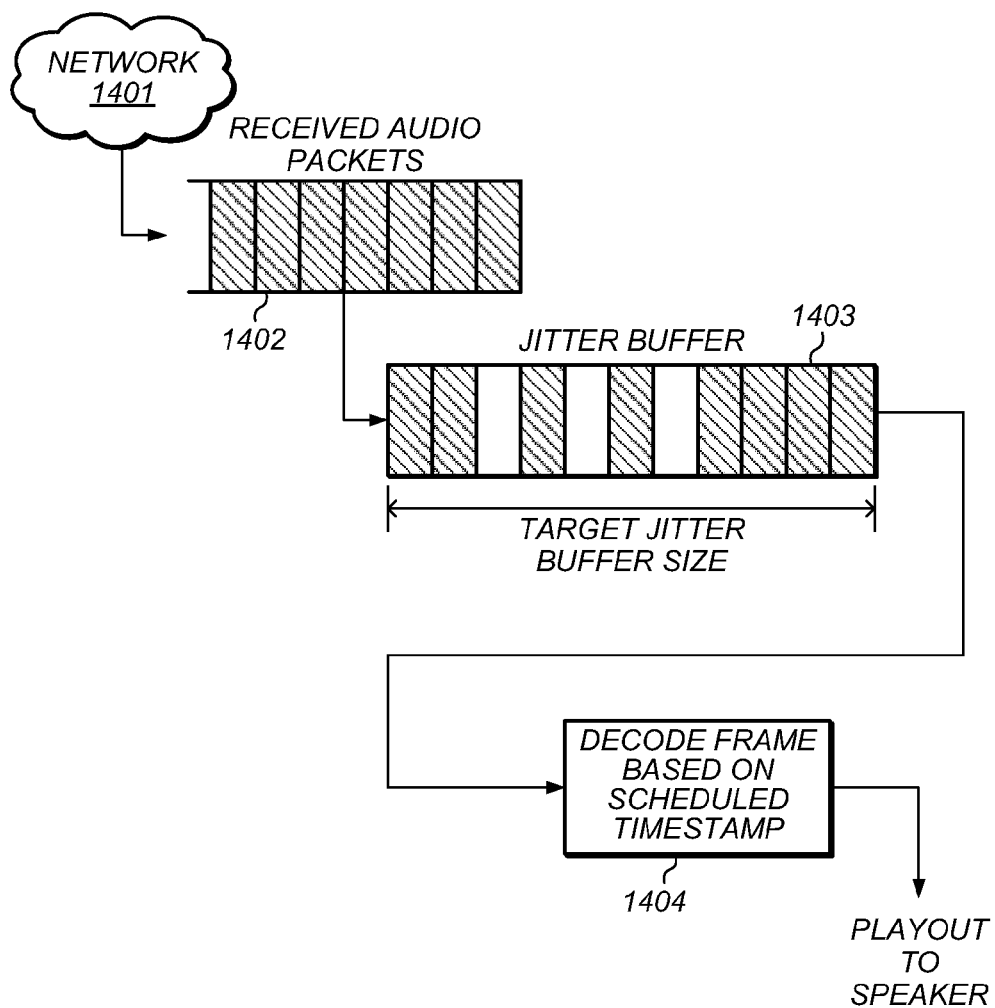
FIG. 14 illustrates a block diagram of an embodiment of a data path for multimedia playback.
Figure 15:
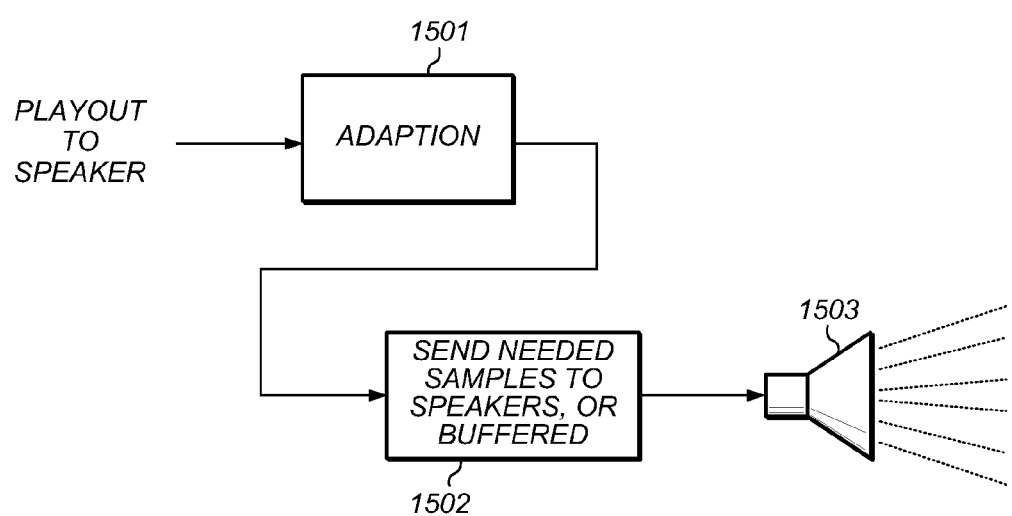
FIG. 15 illustrates a block diagram of an embodiment of a playback path.
Figure 16:
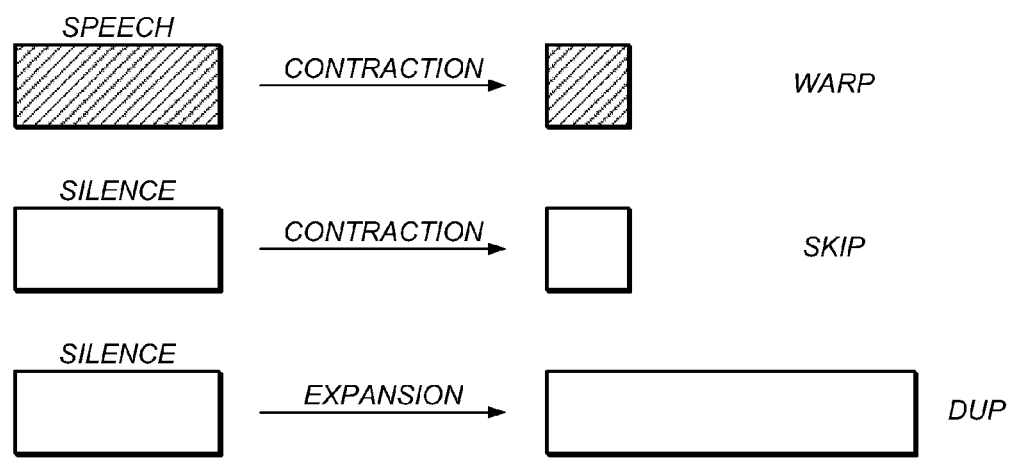
FIG. 16 illustrates an example of adaptation techniques.

A packet flow based view of the receive chain is shown in FIG. 14 and FIG. 15. In order to adjust the size of the jitter buffer to match the estimation from a controller, such as, e.g., controller 403 in FIG. 4, one of "warping," "skipping," or "duping" may be used. To implement such techniques, periods of silence or speech may be detected in decoded samples. In some embodiments, contraction in speech may be necessary and warping is used. The rate of adaptation may be another factor to consider, and the rate may be based on various factors such as, e.g., like silence/speech, amount of adjustment, time since last silence was detected, and the like. An example of possible adaptation method is illustrated in FIG. 16.

In some embodiments, both the instantaneous and root mean square (RMS) value of the audio samples may be used together to detect silence. Since the RMS value of samples falls slower than the instantaneous value, the silence threshold may be detected at an offset from the silence boundary, thereby preventing end of phonemes from being discarded.

In another embodiment, RMS value of the speech may be directly used to control the rate of adaptation. As the RMS value increases, probability of speech may be higher and the rate of adaptation may be lower. This may, in some embodiments, remove the need to use more advanced algorithms to detect speech or silence while still maintaining the same quality of audio playback.

In another embodiment, thresholds may be used to force warping. If silence cannot be detected for a long time due to background noise, for example, from road noise or background music, warping may be performed at a low rate of adaptation even though the thresholds may not warrant warping to be used. This may, in various embodiments, minimize large conversational delays from lingering for a long time.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
   an interface unit configured to receive a plurality of data packets from a network;
   a buffer configured to store a portion of the plurality of data packets dependent upon an estimation of a size of the buffer;
   a control unit configured to:
   calculate a respective jitter value for each data packet of the plurality of data packets to generate a plurality of jitter values;
   determine a slow moving average of the plurality of jitter values;
   determine a slope using a first jitter value associated with a first data packet and a second jitter value associated with a second data packet, wherein the second data packet is received at a different time than the first data packet;
   detect a jump spike in response to a determination that a difference between a particular jitter value and the slow moving average is greater than a product of a jump threshold and the slow moving average;
   detect a slope spike in response to a determination that the slope is greater than a product of a slope threshold and the slow moving average;
   determine the estimation of the size of the buffer dependent upon a clipped size of either of the jump spike or the slope spike;
   perform a comparison between jitter values corresponding to packets received after a start of either the jump spike or the slope spike;
   determine an end of either the jump spike or the slope spike in response to a determination that results of the comparison indicate changes between the jitter values corresponding to packets received after the start of either the jump spike or slope spike are less than a desired; and
   adjust the size of the buffer in response to a detection of the end of either the jump spike or the slope spike, wherein the size is adjusted based on an amount of delay generated by the buffer within a system coupled to the network.

2. The apparatus of claim 1, wherein the control unit is further configured to:
   detect periodic spikes dependent upon network characteristics; and
   determine a minimum size for the buffer dependent upon the periodic spikes.

3. The apparatus of claim 1, wherein the control unit is further configured to:
   detect marginal network conditions;
   determine a cost associated with adjusting the size the buffer to accommodate spikes resulting from the marginal network conditions; and
   clip the spikes resulting from the marginal network conditions dependent upon the cost.

4. The apparatus of claim 1, wherein the control unit is further configured to maintain the estimation of the size of the buffer in response to a determination that a period of congestion or a spike has ended.

5. The apparatus of claim 1, further comprising a playback adaptation module, wherein the playback adaptation module is configured to:
   retrieve data packets from the buffer;

process the data packets into samples; and modify the samples dependent on a difference between the estimation of the size of the buffer and an actual size of the buffer.

6. The apparatus of claim 5, wherein to modify the samples the playback adaptation module is further configured to determine if each sample contains speech or silence dependent upon an instantaneous value of speech energy and a root mean square (RMS) value of a speech energy of each sample.

7. A method, comprising:

receiving a plurality of data packets from a network;

storing a portion of the plurality of data packets in a buffer dependent upon an estimation of a size of the buffer;

calculating a respective jitter value for a particular data packet of the plurality of data packets to generate a plurality of jitter values;

determining a slow moving average of the plurality of jitter values;

determining a slope using a first jitter value associated with a first data packet and a second jitter value associated with a second data packet, wherein the second data packet is received at a different time from the first data packet;

detecting a jump spike in response to determining that a difference between a particular jitter value and the slow moving average is greater than a product of a jump threshold and the slow moving average;

detecting a slope spike in response to determining that the slope is greater than a product of a slope threshold and the slow moving average;

determining the estimation of the size of the buffer dependent upon a clipped size of either of the jump spike or the slope spike;

performing a comparison between jitter values corresponding to packets received after a start of either the jump spike or the slope spike;

determining an end either the jump spike or the slope spike in response to determining that results of the comparison indicate changes between the jitter values corresponding to packets received after the start of either the jump spike or the slope spike are less than a desired value; and adjusting the size of the buffer in response to detecting the end of either the jump spike or the slope spike, wherein the size is adjusted based on an amount of delay generated by the buffer within a system coupled to the network.

8. The method of claim 7, further comprising:

detecting periodic spikes dependent upon network characteristics; and determining a minimum size for the buffer dependent upon the periodic spikes.

9. The method of claim 7, further comprising:

detecting marginal network conditions;

determining a cost associated with adjusting the estimation of the size of the buffer to accommodate spikes resulting from the marginal network conditions; and clipping the spikes resulting from the marginal network conditions dependent upon the cost.

10. The method of claim 7, further comprising maintaining the estimation of the size of the buffer in response to a determination that a period of congestion or a spike has ended.

11. The method of claim 7, further comprising:

retrieving data packets from the buffer;

processing the data packets into samples; and modifying the samples dependent on a difference between the estimation of the size of the buffer and an actual size of the buffer.

12. The method of claim 11, wherein modifying the samples comprises determining if each sample contains speech or silence dependent upon an instantaneous value of speech energy and a root mean square (RMS) value of a speech energy of each sample.

13. The method of claim 11, wherein modifying the samples comprises warping at a low rate responsive to a determination that silence has not been detected for a period of time exceeding a predetermined threshold.

14. A system, comprising:

a first device coupled to a network, wherein the first device is configured to transmit a plurality of data packets via the network; and a second device coupled to the network, wherein the second device is configured to:

receive the plurality of data packets;

store a portion of the plurality of data packets dependent upon an estimation of a size of a buffer;

calculate a respective jitter value for a particular data packet of the plurality of data packets to generate a plurality of jitter values;

determine a slow moving average of the plurality of jitter values;

determine a slope using a first jitter value associated with a first data packet and a second jitter value associated with a second data packet, wherein the second data packet is received at a different time than the first data packet;

detect a jump spike in response to a determination that a difference between a particular jitter value and the slow moving average is greater than a product of a jump threshold and the slow moving average;

detect a slope spike in response to a determination that the slope is greater than a product of a slope threshold and the slow moving average;

determine the estimation of the size of the buffer dependent upon a clipped size of either the jump spike or the slope spike;

perform a comparison between jitter values corresponding to packets received after a start of either the jump spike or the slope spike;

determine an end of either the jump spike or the slope spike in response to a determination that results of the comparison indicate changes between the jitter values corresponding to packets received after the start of either the jump spike or slope spike are less than a desired value; and adjust the size of the buffer in response to a detection of the end of either the jump spike or the slope spike, wherein the size is adjusted based on an amount of delay generated by the buffer within the system.

15. The system of claim 14, wherein the second device is further configured to:

detect periodic spikes dependent upon network characteristics; and determine a minimum size for the buffer dependent upon the periodic spikes.

16. The system of claim 15, wherein the second device is further configured to:

retrieve data packets from the buffer;

process the data packets into samples; and modify the samples dependent on a difference between the estimation of the size of the buffer and an actual size of the buffer.

17. The system of claim 16, wherein to modify the samples the second device is further configured to determine if each sample contains speech or silence dependent upon an instantaneous value of speech energy and a root mean square (RMS) value of a speech energy of each sample.

18. The system of claim 14, wherein the second device is further configured to:
   detect marginal network conditions;
   determine a cost associated with adjusting the estimation of the size of the buffer to accommodate spikes resulting from the marginal network conditions; and
   clip the spikes resulting from the marginal network conditions dependent upon the cost.

19. The system of claim 14, wherein the second device is further configured to maintain the estimation of the size of the buffer in response responsive to a determination that a period of congestion or a spike has ended.

\* \* \* \* \*